Patented Oct. 3, 1933

1,928,996

UNITED STATES PATENT OFFICE

1,928,996

SIZING AGENT FOR CELLULOSE ACETATE SILK

Herbert Gensel, Cologne-Mulheim, and Max Hagedorn, Dessau, Germany, assignors, by mesne assignments, to General Aniline Works, Inc., New York, N. Y.

No Drawing. Application August 27, 1930, Serial No. 478,298, and in Germany September 23, 1929

6 Claims. (Cl. 91—68)

This invention relates to new sizing agents for cellulose acetate silk and to acetate silk sized therewith.

Preparations from potato flour or soluble starch are mainly employed as sizing agents in the textile industry, but experience has shown that these sizing agents do not exert the desired sizing effect on cellulose acetate silk.

In accordance with the present invention hydroxy alkyl ethers of higher molecular carbohydrates which are obtainable by the interaction of higher molecular carbohydrates or derivatives thereof with alkylene oxides in the presence of aqueous alkalies are employed for sizing cellulose acetate silk. As hydroxy alkyl ethers of carbohydrates coming into consideration for the purpose of the invention there may be mentioned by way of example, hydroxy ethyl cellulose ether, hydroxy propyl starch ether, hydroxy butyl starch ether.

According to the specific material to be sized the hydroxy alkyl ethers of carbohydrates are applied in the varied manners, as can be seen from the examples. The quantities to be added of the sizing agents to cellulose acetate silk may vary in wide ranges, on carrying out our new invention everyone skilled in the art will find a suitable concentration.

The invention is further illustrated by the following examples without being restricted thereto:

Example 1.—Cellulose acetate silk is immersed and agitated at ordinary temperature in an aqueous bath in which are dissolved 25 grams per liter of hydroxy propyl starch ether, obtainable by the interaction of starch with propylene oxide in the presence of caustic soda lye. The cellulose acetate silk is squeezed out and dried at 50° C. The cellulose acetate silk thread, thus sized, is very well bound and possesses a good touch. The removal of the sizing agent takes place by mere immersion and agitating in water at 60° C. without further additions.

Example 2.—Cellulose acetate silk is immersed and agitated at ordinary temperature in an aqueous bath in which are dissolved per liter 40 grams of hydroxy ethyl cellulose ether obtained by the treatment of soda pulp with ethylene oxide. The acetate silk is squeezed out and dried at 50° C. The cellulose acetate silk thread thus sized is very well bound and possesses a good touch. The removal of the sizing agent takes place by mere immersion and agitating in water at 60° C. without further additions.

We claim:

1. As a new product of manufacture cellulose acetate silk sized with a water-soluble hydroxy alkyl ether of a higher molecular carbohydrate which ether is removable by agitation in water at 60° C.

2. As a new product of manufacture cellulose acetate silk sized with a water-soluble hydroxy alkyl ether of starch which ether is removable by agitation in water at 60° C.

3. As a new product of manufacture cellulose acetate silk sized with a water-soluble hydroxy propyl starch ether which ether is removable by agitation in water at 60° C.

4. The process which comprises sizing cellulose acetate silk with a water-soluble hydroxy alkyl ether of a higher molecular carbohydrate which may be dissolved out of the sized silk by agitation in water at 60° C.

5. The process which comprises sizing cellulose acetate silk with a water-soluble hydroxy alkyl ether of starch which may be dissolved out of the sized silk by agitation in water at 60° C.

6. The process which comprises sizing cellulose acetate silk with a water-soluble hydroxy propyl starch ether which may be dissolved out of the sized silk by agitation in water at 60° C.

HERBERT GENSEL.
MAX HAGEDORN.